May 7, 1963     R. G. POST     3,088,904
NUCLEAR REACTOR
Filed Oct. 17, 1960
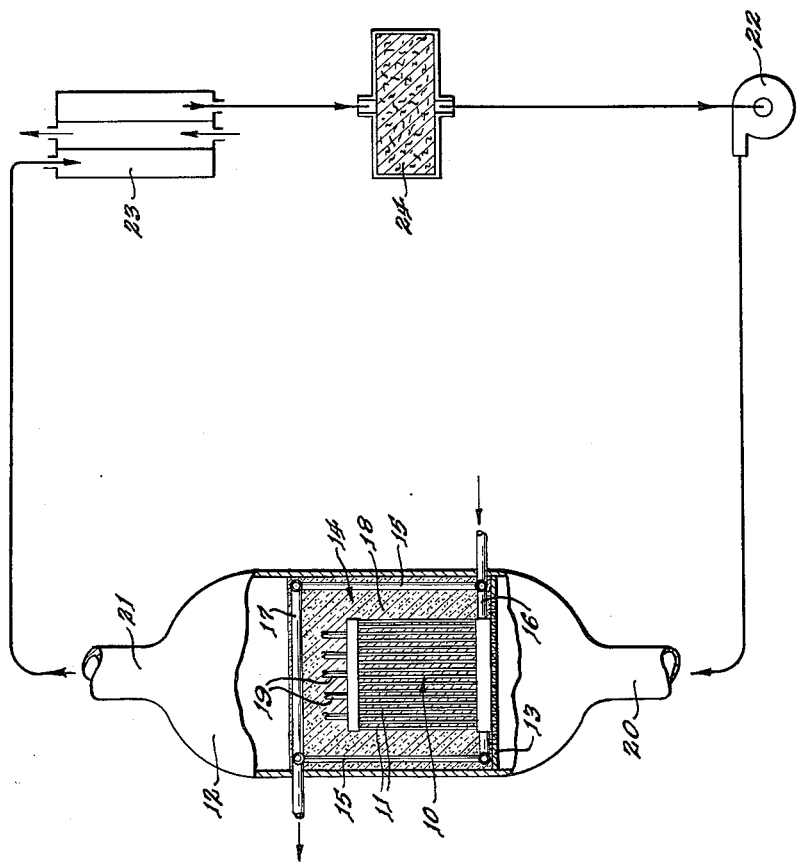
INVENTOR.
*Roy G. Post*
BY
*Roland A. Anderson*
*Attorney*

3,088,904
NUCLEAR REACTOR
Roy G. Post, Richardson, Tex., assignor to the United States of America as represented by the United States Atomic Energy Commission
Filed Oct. 17, 1960, Ser. No. 63,230
2 Claims. (Cl. 204—193.2)
(Granted under Title 35, U.S. Code (1952), sec. 266)

This invention relates to a nuclear reactor. In more detail the invention relates to a water-cooled nuclear reactor in which the coolant tubes are located outside of the reactive zone of the reactor. And in still more detail the invention relates to such a reactor in which a fluidized moderator serves to transfer heat from the reactive zone to the coolant tubes.

Liquid-cooled reactors are more suited to economic nuclear power through conventional steam-electric plants than are gas-cooled reactors because of their larger volumetric heat capacity. Although other liquid coolants can and have been used in nuclear reactors, light water is the usual choice for a power reactor because of its low cost and ready availability and because the technology of materials of construction is well advanced. Heavy water, of course, is also a possible choice although its cost probably precludes its use at present in a power reactor. Although the advantages of light water are sufficient to dictate its selection, it is well known that water also has a number of disadvantages such as its corrosive action on metals, a low boiling point at normal pressures, decomposition under radiation, and sufficient radioactivity under neutron-radiation to make shielding necessary. In general, therefore, water-cooled power reactors as constructed in the past included corrosion-resistant cladding on the fuel elements, heavy coolant tubes which were capable of withstanding a high pressure, shielding for the entire primary water circuit, and recombiners to reconstitute the decomposed water. Obviously, inclusion of these features adds to the cost of the reactor. In particular, the cladding and heavy coolant tubes add to the inventory of fissionable material required to maintain a chain reaction because the only suitable materials have appreciable cross sections for thermal neutrons.

It is accordingly one object of the present invention to develop a water-cooled nuclear reactor in which the water coolant is completely excluded from the reactive zone of the reactor.

It is another object of the present invention to develop a water-cooled nuclear reactor which does not require corrosion-resistant cladding on the fuel elements.

It is a further object of the present invention to develop a water-cooled nuclear reactor which does not require recombiners or substantial shielding for the water coolant.

It is also an object of the present invention to develop a nuclear reactor incorporating a fluidized moderator.

It is still another object of the present invention to develop a nuclear reactor in which a fluidized bed of graphite particles serves as the primary heat transfer medium.

These and other objects of the present invention are attained by a nuclear reactor constructed according to my invention which includes a fluidized bed of graphite particles acting as moderator and as primary heat transfer means to water tubes located outside of the reactive zone of the reactor. Since the water coolant is completely removed from the reactive zone of the reactor, corrosion-resistant cladding is not necessary on the fuel elements, the coolant tubes can be constructed of any material desired and as heavy as necessary without affecting the reactivity of the reactor, the water does not become radioactive and no recombiner is needed.

The invention will next be described in connection with the accompanying drawing wherein the single figure is a diagramamtic view of a nuclear reactor according to my invention.

The reactor comprises a core 10 consisting of a plurality of vertically disposed fuel elements 11. According to the specific embodiment of the invention which is hereinafter described in compliance with the patent statutes, the fuel elements are composed of uranium dioxide compacted to a high density and enclosed within zirconium cladding for structural strength and to prevent the escape of fission products.

The reactor core 10 is disposed within a vertical, cylindrical pressure vessel 12 just above a horizontal flow distributor 13 which extends across pressure vessel 12. The core 10 is spaced from the pressure vessel 12 to provide space for a reflector 14 which will be hereinafter described. Within this space a plurality of vertical coolant tubes 15 exending between an inlet header 16 and an outlet header 17 are disposed. Ordinary water is the preferred coolant.

The reactor is moderated by a fluidized bed 18 of graphite particles approximately 100 mesh in size. The fluidized bed 18 fills the space between fuel elements 11 and also fills the space between the core 10 and the pressure vessel 12, thus constituting reflector 14.

Primary control of the reactor is obtained by varying the height of the fluidized bed 18 and thereby the amount of moderation and reflection of neutrons obtained in the reactor. Secondary control is by means of conventional control rods 19, shown diagrammatically as is the rest of the reactor structure.

Pressure vessel 12 is provided with a gas inlet line 20 at the bottom thereof and a gas outlet line 21 at the top thereof. The gas employed for fluidizing the graphite particles may be and preferably is helium. The helium is forced into the pressure vessel 12 through inlet line 20 by pump 22. The helium passes upwardly through flow distributor 13 through the bed 18 of graphite particles to fluidize them, then out through outlet line 21 for return to the pressure vessel 12 after passage through a heat exchanger 23 and a filter 24. The helium is cooled in heat exchanger 23 and approximately 1% of the total heat produced by the reactor is obtained by this device. The remainder of the heat developed in the reactor is obtained from the coolant which flows through coolant tubes 15 to conventional equipment for the utilization of the heat. This heat is transferred from the fuel elements to the fluidized bed 18, across the fluidized bed, and then from the fluidized bed to the coolant within the coolant tubes 15.

A fluidized bed has a high heat transfer rate because of the violent agitation of the individual particles making up the bed. Therefore the fluidized bed 18 will transfer the heat developed in the reactor core 10 to the coolant tubes 15 which are located outside of the reactor core 10 without a substantial heat gradient between the source of heat and the cooling location. Since the coolant tubes 15 are located outside of the reactor core, the effects of radiation thereon and on the coolant contained therein are very much reduced. One adavntage is that the coolant need not be shielded to the same extent as if it passed through the reactor core. Another advantage is that no recombiner is necessary. Although there will be some decomposition of the water, the amount is low and no recombiner is needed. Since the water does not behave as a moderator, phase changes from water to steam within the coolant tubes do not present flux distribution problems.

A basic advantage of the design is that the fuel elements are not exposed to a corrosive environment since the water employed for cooling is far removed from them.

Since the coolant tubes are removed from the reactor core, reactivity is not consumed thereby and high pressure tubes capable of containing steam at a temperature and under a pressure comparable to that employed in conventional steam boilers can be employed.

The safety aspects of this reactor are almost ideal. In the event of serious incidents the moderator can be dumped by either stopping or greatly increasing helium flow. The specific details of structure for this purpose are not disclosed because this forms no part of the present invention.

Almost any abrupt change in the effectiveness of the cooling system or sudden increase in the helium temperature will materially alter the graphite density—hence change the carbon-uranium ratio. Loss of helium will drop the fluidized graphite below the top of the core, reducing the ratio to a very low value. Loss of steam, with consequent overheating of the helium, can result in several phenomena, each of which will reduce the carbon-uranium ratio. These are: (1) Reaction of graphite with steam if the leak is internal. This will result in the maximum increase in gas volume in the reactor. This reaction represents a rather large heat sink since the reaction is endothermic. (2) Decrease in fluid bed density by increased helium velocity due to the heat.

The following table gives the parameters of a specific reactor which may be constructed in accordance with my invention. It will be understood that much smaller reactors are equally feasible.

| | |
|---|---|
| Thermal power | 1000 M.W. |
| Core height | 38 ft. |
| Core diameter | 38 ft. |
| Thickness of reflector | 3 ft. |
| Diameter of fuel rods | 0.7 in. |
| No. of fuel rods | 12,100. |
| Spacing | 3.67 in. center to center in rectangular lattice. |
| Total weight of uranium | 400 tons. |
| Total weight of graphite including reflector | 940 tons. |
| Coolant temperature | 68° F. |
| Steam temperature | 1000° F. |
| Steam pressure | 2500 lbs./sq. in. |
| Carbon to uranium atomic ratio | 30-1. |
| Maximum fuel core temperature | 2500° C. |
| Fuel surface temperature | 1600° C. |

Other fuel materials may also be employed. For example, uranium monocarbide holds great promise for the future. Another possibility is a graphite matrix of uranium dicarbide.

It will be understood that this invention is not to be limited to the details given herein but that it may be modified within the scope of the appended claims.

What is claimed is:

1. A nuclear reactor comprising a vertical, cylindrical pressure vessel, a horizontal flow distributor extending across said vessel, a plurality of vertically disposed fuel elements formed of uranium dioxide centrally located in said pressure vessel and spaced therefrom above said flow distributor, a mass of graphite particles of about 100 mesh size disposed in said pressure vessel above said flow distributor, variable pumping means for forcing helium into the pressure vessel below the flow distributor so that the helium rises through the graphite particles to establish and maintain a fluidized bed thereof, a water inlet header disposed near the bottom of said fluidized bed, a water outlet header disposed near the top of said fluidized bed, vertical coolant tubes located in the space between the fuel elements and the pressure vessel extending between said headers, and means for flowing water therethrough.

2. A nuclear reactor comprising a vertical, cylindrical pressure vessel, a horizontal flow distributor extending across said vessel, a plurality of vertically disposed spaced fuel elements centrally located in said pressure vessel and spaced above said flow distributor, a mass of graphite particles disposed in said pressure vessel, secondary coolant tubes located in said pressure vessel laterally spaced from said fuel elements, means for flowing a liquid secondary coolant through said secondary coolant tubes, variable pumping means for forcing a gas into the pressure vessel below the flow distributor so that the gas rises through the graphite particles to establish and maintain a fluidized graphite bed to form a moderator and reflector and to act as a primary coolant for transferring heat from the fuel elements to the secondary coolant tubes.

References Cited in the file of this patent

UNITED STATES PATENTS 2,929,767 Hammond et al. _____ Mar. 22, 1960

FOREIGN PATENTS 167,674 Australia _____ Apr. 10, 1953
756,014 Great Britain _____ Aug. 29, 1956

OTHER REFERENCES

Zinn et al.: Nuclear Science and Engineering, vol. 1, October 1956, pp. 423, 428, 434, 435.